United States Patent Office 3,492,385
Patented Jan. 27, 1970

3,492,385
PROCESS FOR ACCELERATING THE INITIAL HARDENING OF ELEMENTS FORMED OF A MIXTURE OF CEMENT OR OTHER LIME-CONTAINING HYDRAULIC BINDER AND ORGANIC OR INORGANIC AGGREGATES THEREFOR
Branko Simunic, Zurich, Switzerland, assignor to Durisol AG fur Leichtbaustoffe, Zurich, Switzerland, a corporation of Switzerland
Filed June 23, 1967, Ser. No. 648,371
Int. Cl. C04b 15/14; B29c 25/00
U.S. Cl. 264—82                14 Claims

ABSTRACT OF THE DISCLOSURE

Acceleration of the initial hardening of elements formed of a mixture of lime-containing hydraulic binder and aggregates therefor by passing the same continuously through alternating warm moist zones and cool moist zones with carbon dioxide-enriched atmospheres therein. The warm zones are disposed above the cool zones with forced air circulation maintaining the uniformity in the individual zones. Water nozzles are provided for increasing relative humidity to provide water of hydration and to prevent desiccation of the elements during processing. Increased pressure may be utilized to intensify the hardening process and the carbon dioxide source may be combustion gases from the means for heating the air in the warm zones.

---

Figures 1, 2:
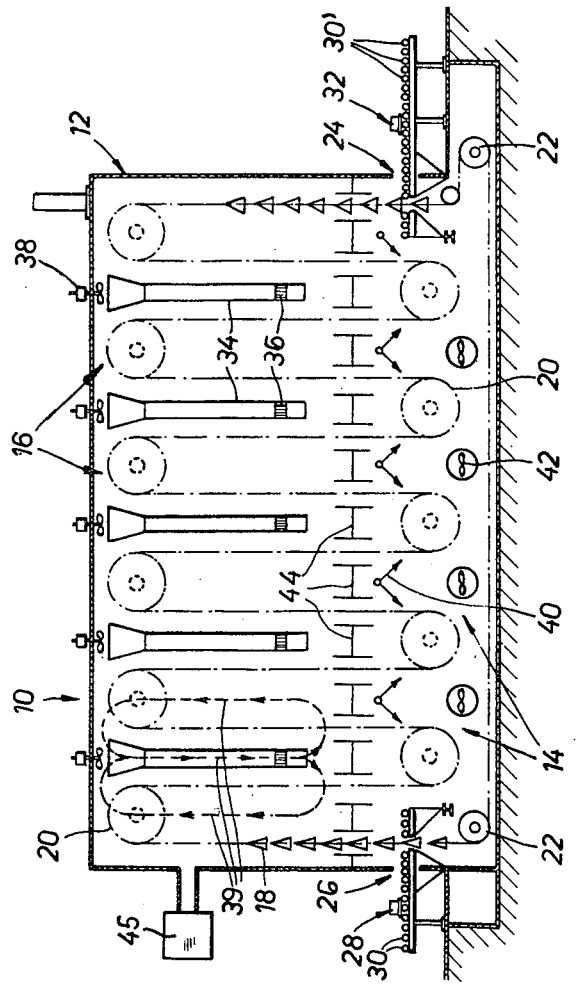

This invention relates to methods and means for accelerating the initial hardening of bodies formed of a mixture of a hydraulic binder such as cement and organic or inorganic aggregates therefor and relates more particularly to improvements over present techniques for at least partially hardening freshly molded elements formed of concrete or the like. Substantial work has been done in this area in order to facilitate the production of molded elements formed of time-containing hydraulic binders and aggregate material therefor within a shorter time than was possible with earlier setting procedures, but to date no fully satisfactory procedure has been developed, which is suitable for light-weight concrete.

First of all, it should be recognized that molded concrete elements and the like are produced in relatively large quantities whereby cost is a significant factor in the manufacturing operation. Of course, shortening the hardening time, at least for the initial phase of such operations so that the elements can be readily handled for further processing, plays a significant role in the unit cost of such elements. However, procedures for expediting the hardening operation must not detrimentally affect the properties of the elements. Also, if the costs of the techniques which shorten the hardening times and the apparatus necessitated thereby is relatively high, the advantages resulting from the accelerated hardening may be quickly outweighed or at least substantially offset by the economic disadvantages inherent in such a system. Thus, it will be seen that there is more to consider than merely providing a technique for decreasing the time required for hardening such molded elements.

One of the prior art suggestions for accelerating the initial hardening operation with such elements is disclosed in Swiss Patent No. 388,188 of June 15, 1965. In this patent, freshly molded elements are subjected during their setting period to alternating increases and decreases of temperature in a closed chamber having a carbon dioxide-enriched atmosphere. The temperature with such process may reach 80° C. during the heating periods and must not fall below 30° C. during the subsequent cooling periods. As explained in this Swiss patent, the relative humidity must not fall below 55 percent and the carbon dioxide content of the air must not fall below 5 percent throughout the processing cycle.

While the technique described immediately hereinabove does accelerate the hardening operation when considered in contrast to earlier procedures, it still suffers from various disadvantages. For example, when the concrete or the like contains organic aggregates, temperatures as high as 80° C. such as may be reached in certain steps of the process disclosed in the aforementioned Swiss patent, may deteriorate the same. Specifically, various inhibitor reactions to be described in more detail hereinafter may occur which disturb or prevent the setting of the cement. Additionally, the rapidly rising chamber temperature utilized during the initial heating period may cause difficulties due to the subsequent development of the heat of the concrete caused by the exothermic setting process which can lead to dangerous temperature peaks. Further, during the cooling periods, damage through desiccation frequently occurs, caused by the forced input of cool air considerably reducing the relative humidity of the chamber atmosphere. The moisture traveling within each individual element towards it outside should, during such movement, cede to the concrete the required water of hydration, but, due to the rapid movement of the moisture under the influence of the large vapor pressure differential produced by the techniques disclosed in the Swiss patent, frequently is prevented from doing so.

In addition to the aforementioned disadvantages in the resultant products, there are other significant processing problems resulting from techniques such as disclosed in the Swiss patent. For instance, the use of a chamber of the type suggested in the Swiss patent makes it relatively difficult to obtain uniform temperature and humidity levels over the entire height of the chamber, and still more difficult to maintain such levels. Thus, uniform hardening of the elements within the chamber is impaired since a part of the chamber contents is always situated in an unfavorable temperature or humidity zone. Additionally, the arrangement suggested by the Swiss patent is economically unsound because, with each change of the chamber air temperature, the interior surfaces of the chamber walls, ceiling and floor must be heated or cooled, leading to an unproductive consumption of energy. Thus, the procedure suggested by the Swiss patent may be considered to be lacking in efficiency.

It is therefore, a primary object of the instant invention to provide a method and a means for accelerating the initial hardening of building elements or the like consisting of lime-containing hydraulic binders and aggregate material therefor, which are free from the foregoing and other such disadvantages. Specifically, the instant invention contemplates the provision of techniques for reducing setting time in freshly molded concrete or the like elements which is continuous in nature whereby large numbers of such elements may be readily processed in a short time. Additionally, this invention has as one of its basic objects the provision of a method and means for effecting the results set forth hereinabove at temperature ranges which will not deleteriously affect the constituents from which the elements are formed. Consistent with the foregoing, this invention provides processing techniques which operate at sufficient speed that cement-inhibition reactions which might occur with prior art procedures are obviated.

Another significant object of the instant invention is the provision of a method and means for accelerating the initial hardening of freshly molded concrete or the like elements wherein the temperature and relative humidity are readily controlled so that the individual elements are each subjected to substantially identical conditions. Also, the procedure of this invention provides a non-linear rise and fall of temperature, in contrast to prior art techniques, by utilizing a stepwise temperature variation thus avoiding undesirable temperature peaks inside the concrete elements as well as an excessively rapid moisture movement during the cooling periods. Additionally, the instant inventive concepts provide for more uniform penetration of heat and the like into the individual building elements thereby resulting in more even processing of the same.

Other important objects of this invention which are more pertinent with respect to economics, include more efficient consumption of energy by heating and cooling the building elements in separate zones in contrast to the use of a single zone such as in prior art techniques. Along these same lines, the specific arrangement of the heating and cooling zones in the preferred embodiment of the instant invention precludes the necessity for insulation between successive heating and cooling zones making use of the ordinary separation between hot and cool air caused by placing the hot zones over the cool zones. Additionally, the use of forced air circulation of the atmosphere maintains uniformity in the individual zones.

Other and further objects of the instant invention reside in the individual processing steps and the combination and arrangement of elements in the apparatus used therewith. Still other objects will in part be obvious and in part be pointed out as the description of the invention proceeds and as shown in the accompanying drawing wherein:

FIGURE 1 is a schematic side elevational view of an installation for processing freshly molded elements according to preferred embodiments of the instant inventive concepts; and FIGURE 2 is a vertical cross-sectional view therethrough.

Like reference characters refer to like parts throughout the several views of the drawing.

Referring now to the drawing, an installation according to the instant inventive concepts is designated generally by the reference numeral 10 and comprises basically a housing 12 in which a plurality of lower cool zones 14 and a plurality of upper warm zones 16 are defined. A continuous conveyor means 18 is trained over pulleys 20 to provide a plurality of upward and downward passes through successive warm and cool zones. Additional pulleys 22 are provided for returning the conveyor means 18 from the exit end 24 of the installation 10 to the entrance end 26 thereof.

At the entrance end 26 of the installation 10, any conventional means shown schematically at 30 may be provided for continuously feeding freshly molded elements 28 onto the conveyor means 18 and at the exit end 24 any conventional means shown schematically at 30' may be provided for removing the partially hardened elements 32 therefrom.

Vertical air ducts 34 extend between successive warm zones 16 with heating means 36 disposed within the ducts 34. Blower means in the form of fans 38 or the like are provided to push the warm air downwardly to provide uniform air circulation as illustrated by the dotted arrows 39 in the left-hand air duct 34 in FIGURE 1.

Spray nozzles 40 are provided in each of the cool zones 14 to diffuse a water mist and maintain the necessary air humidity, with additional fans 42 insuring the required air circulation.

Any conventional means may be provided for enriching the atmosphere in the various zones with carbon dioxide, such as for example a combustion device 45 producing combustion gases rich in carbon dioxide which may be introduced into the housing 12.

Additionally, if desired, any conventional means (not shown) may be utilized to maintain at least some of the zones at a pressure above atmospheric in order to intensify the hardening process.

According to the preferred operating conditions utilized according to the instant inventive concepts, the temperature in the various warm zones 16 is controlled so that the initial warm zone has a temperature of about 60° C. with the temperature in the subsequent warm zones rising to a level of about 70° C. in the last warm zone. Similarly, the relative air humidity is controlled to provide approximately 75 percent relative humidity in the initial warm zone with a reduction over the various zones to approximately 55 percent relative humidity in the last warm zone. The atmosphere in all of the zones are provided preferably with approximately 5 percent carbon dioxide, but not less than about 3 percent carbon dioxide.

Although it is believed that the instant inventive concepts are readily understood from the foregoing description, the following specific Example is set forth in order to further illustrate the same:

2100 liters (74 cubic feet) of impregnated wood shavings or of other vegetable raw materials are mixed with 300 kilograms (60 pounds) of portland cement. The freshly mixed material is, in a moistened or plastic condition, introduced under vibration into hollow block molds and lightly pressed. The presser lids and molds are removed after a few minutes, the blocks supported on pallets are pushed at regular time intervals onto a continuously running chain conveyor such as the means 18 shown in FIGURE 1. In the illustrated installation 10, the conveyor means 18 takes the hollow blocks 28 five times alternately through a cool zone 14 and a warm zone 16, travelling at a preferred speed of about 1 meter per minute. In the air ducts 34, the required heat is provided by the heating means 36, the fans 38 serving to push the warm air downwardly through the ducts 34 and past the heating means 36. The water nozzles 40 in the cool zones 14 provide a water mist maintaining the desired humidity with the additional fans 42 insuring uniform air circulation. The initial warm zones contains moist air with an admixture of carbon dioxide at a temperature of about 60° C. In the next warm zone the temperature is slightly higher, with the temperatures increasing still further in each additional warm zone until the last warm zone wherein a temperature of about 70° C. is provided. The relative air humidity falls from about 75 percent in the first zone to about 55 percent in the last, with the carbon dioxide content being at about 5 percent in the initial warm and cool zones and about 3 percent in the final warm and cool zones.

The above conditions are set forth merely as illustrative, and are not to be considered in a limiting sense. For example, the conveyor speed, the temperature limits and the carbon dioxide content of the chamber air can be adjusted in accordance with the requirements of the individual treated elements. In any event, however, relatively lower temperatures are utilized than have been necessary with prior art systems such as is disclosed in the aforementioned Swiss patent. Thus, acceleration of the hardening procedure is effected at a temperature which is still bearable by organic aggregates without disturbing the setting process or disintegrating the aggregate material. In particular, the setting process proceeds at a speed that prevents the slow moving reactions between so-called "cement inhibitors" contained in organic aggregates and the components of the cement from exercising any effect. Particularly, in contrast to prior art techniques the disturbance or prevention of the setting of the cements through the action of sugar solutions acting as enveloping colloids or of products of cellulose decomposition is obviated in most cases. The acceleration of binding is heightened by the better utilization of the heat input. Additionally the hardening is more uniform and due to the improved diffusion and heat exchange conditions penetrates better to the interior of the individual elements.

An immediate economic advantage ensues from placing the warm and cool zones as shown in FIGURE 1, with the latter being situated beneath the former. In this manner, the natural separation between warm and cool air can be utilized so that no rigid mutual insulation between the two zones is required but simple partition panels 44 are sufficient, and the transportation of the elements through the installation is not impeded by such partitions. Further, the constant temperature in the individual zones eliminates the costs necessitated by utilizing a single zone which is alternately heated and cooled.

The various conditions are so arranged that on leaving the final zone, the treated elements 32 have reached a sufficient degree of strength as to be handled for further processing. The particular design of the installation utilized according to the preferred embodiments of this invention insures relative uniformity in the atmospheric conditions to which the elements are subjected providing for homogeneity in the individual zones thereby insuring more uniform treatment of the elments as they pass therethrough, both from the standpoint of temperature and humidity as well as the other variables.

Thus, it will now be seen that there are herein provided improved methods and means for accelerating the initial hardening of elements formed of a mixture of a lime-containing hydraulic binder such as cement and organic or inorganic aggregates therefor which satisfy all of the objectives of the instant invention, and others, including many advantages of great practical utility and commercial importance.

What is claimed is:

1. A process for at least partially hardening elements formed of a mixture of a lime-containing hydraulic binder and aggregate material therefor comprising the steps of:
   (a) providing a plurality of alternating warm and cool zones, said warm zones being positioned above said cool zones, the temperature in successive warm zones increasing from approximately 60° C. in the first of said warm zones to approximately 70° C. in the last of said warm zones;
   (b) enriching the atmosphere in each of said zones with carbon dioxide to provide at least about a 3 percent carbon dioxide content in each of said zones;
   (c) maintaining the atmosphere in each of said zones moistened to provide water of hydration for said mixture and to preclude desiccation of the same; and
   (d) continuously conveying said elements in freshly molded condition through said alternating warm and cool zones.

2. The process of claim 1 wherein said lime-containing hydraulic binder is portland cement.

3. The process of claim 1 wherien the relative humidity in successive warm zones is decreased from about 75 percent in said first warm zone to about 55 percent in said last warm zone.

4. The process of claim 1 wherein the atmosphere in each of said zones is enriched with carbon dioxide to provide approximately a 5 percent carbon dioxide content.

5. The process of claim 1 wherein said elements are alternately conveyed upwardly and downwardly through successive zones.

6. The process of claim 5 further comprising maintaining a uniform atmosphere in each of said zones by forced air circulation.

7. The process of claim 1 wherein the hardening process is intensified by maintaining the pressure in at least some of said zones above atmospheric.

8. The process of claim 1 wherein said warm zones are heated by combustion of a fuel which provides carbon dioxide in the combustion gases, said combustion gases being utilized as a source of carbon dioxide for step (b).

9. A system for at least partially hardening elements formed of a mixture of a lime-containing hydraulic binder and aggregate material therefor comprising:
   (a) means defining a plurality of alternating warm and cool zones, said warm zones being positioned above, and in direct communication with, said cool zones;
   (b) heater means in each of said warm zones for maintaining a desired elevated temperature therein;
   (c) moistening means for moistening the atmosphere in each of said zones;
   (d) means defining a source of carbon dioxide and means for feeding carbon dioxide from said source into said zones to enrich the atmosphere in each of said zones with carbon dioxide; and
   (e) means for continuously moving said elements in freshly molded condition through said alternating warm and cool zones.

10. The system of claim 9 wherein said moving means being conveyor means passing upwardly and downwardly through successive zones.

11. The system of claim 10 including vertical ducts extending between successive warm zones, said heater means being positioned within said ducts, and blower means blowing downwardly into and through said ducts to heat and circulate the atmosphere within said zones.

12. The system of claim 11 wherein said moistening means are positioned within each of said cool zones, further including additional blower means blowing upwardly past said moistening means to circulate moisture therefrom and uniformly admix the same with the atmosphere in said zones.

13. The system of claim 9 further including means for maintaining a pressure above atmospheric in at least some of said zones.

14. The system of claim 9 wherein said means defining a source of carbon dioxide includes combustion means for burning a fuel and producing combustion gases containing carbon dioxide, said combustion gases defining said source of carbon dioxide.

References Cited

UNITED STATES PATENTS

| | | | |
|---|---|---|---|
| 911,547 | 2/1909 | Schwanenberg | 264—82 X |
| 3,091,833 | 6/1963 | Kovach | 25—133 X |
| 3,238,279 | 3/1966 | Tarlton et al. | 264—82 |

ROBERT F. WHITE, Primary Examiner

K. J. HOVET, Assistant Examiner

U.S. Cl. X.R.

25—2, 133; 263—53; 264—234, 345